Patented Sept. 6, 1949

2,480,892

UNITED STATES PATENT OFFICE 2,480,892

PREPARATION OF 2-CARBOALKOXY-1,3-BUTADIENE DIMERS BY PYROLYSIS OF Δ'-CARBOALKOXY CYCLOHEXENES

Jerome C. Westfahl, Trumansburg, N. Y., assignor to The B. F. Goodrich Company, New York, N. Y., a corporation of New York No Drawing. Application June 25, 1948, Serial No. 35,287

4 Claims. (Cl. 260—468)

1

This invention relates to a method for the preparation of dimers of 2-carboalkoxy-1,3-butadienes, which method involves the pyrolysis of certain Δ'-substituted cyclohexenes.

It is disclosed in a copending application, Serial No. 35,286, filed June 25, 1948, that useful dimers of 2-carboalkoxy-1,3-butadienes, which dimers have the structure

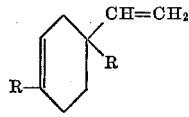

wherein each R is a carboalkoxy radical, may be prepared by pyrolyzing 2,2,3-substituted butanes of the formula

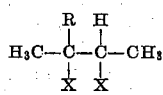

wherein R is a carboalkoxy radical and each X is a radical derived by removing the acidic hydrogen atom of an acid which is volatile at the temperature of pyrolysis.

I have now discovered that similar dimers of 2-carboalkoxy-1,3-butadienes, also having the structure

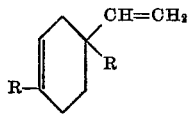

wherein R is a carboalkoxy radical, preferably containing fewer than 6 carbon atoms, may be readily prepared by pyrolyzing Δ'-carboalkoxy cyclohexenes, that is, cyclohexenes possessing the formula

wherein R has the same meaning as above. The pyrolysis reaction proceeds substantially as follows:

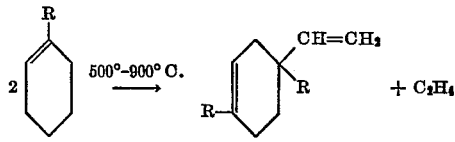

wherein each X is a carboalkoxy radical.

The Δ'-substituted cyclohexenes which are pyrolyzed to obtain dimers of 2-carboalkoxy-1,3-butadienes in accordance with the invention may be prepared in several ways. One method consists in hydrolyzing Δ'-cyclohexene nitrile to Δ'-tetrahydrobenzoic acid and then esterifying the acid thus obtained to give the Δ'-carboalkoxy cyclohexene which can then be pyrolyzed to the 2-carboalkoxy-1,3-butadiene dimer.

A second method involves the high pressure catalytic hydrogenation of a lower alkyl salicylate to obtain the hexahydroalkyl salicylate, which can then be dehydrated catalytically over a dehydration catalyst or by pyrolysis of the ester to give the desired Δ'-carboalkoxy cyclohexene.

The pyrolysis of Δ'-carboalkoxy cyclohexenes to obtain 2-carboalkoxy-1,3-butadiene dimers may be carried out in several different manners. For example, one method consists in passing vapors of the Δ'-carboalkoxy cyclohexene through a heated metal tube, which is connected to a receiver, preferably provided with external cooling means so as to liquify the pyrolysis product. Preferably, a current of an inert gas or diluent such as carbon dioxide, nitrous oxide, nitrogen or the like is used to insure passage of the Δ'-carboalkoxy cyclohexene vapors through the pyrolysis tube. Variations in this method involve the use of a glass pyrolysis tube instead of a metal tube, or pyrolyzing the starting material over a hot resistance wire.

The pyrolysis reaction is preferably carried out at reduced pressures, and especially at pressures below 50 mm. although pressures up to and including atmospheric pressure are operative.

The temperature at which the pyrolysis is conducted may be varied widely. For example, temperatures as low as 500° C. or lower and as high as 900° C. or even higher may be used, with the preferred range being from 750° to 850° C.

The products of the pyrolysis reaction are a combustible gas (assumed to be ethylene) and a liquid mixture containing unchanged Δ'-carboalkoxy-cyclohexene and 2-carboalkoxy-1,3-butadiene dimer. The desired dimer is obtained from the reaction mixture by fractionation or other usual methods of separation.

The more detailed practice of the invention is set forth by the following examples. There are, of course, many forms of the invention other than these specific embodiments. All parts are by weight.

*Example I*

139 parts of Δ'-cyclohexene nitrile are hydrolyzed to Δ'-tetrahydrobenzoic acid by heating with 165 parts of potassium hydroxide, 545 parts of ethyl alcohol, and 330 parts of water for 19 hours in a reactor equipped with a reflux condenser. The solution is reduced in volume by downward distillation, and then acidified with 37% hydrochloric acid. 163.7 parts of tetrahydrobenzoic acid are obtained. The acid is then converted to the methyl ester by refluxing with 332 parts of methyl alcohol and 77 parts concentrated sulfuric acid at 95° C. for 1 hour. The solution is extracted with 284 parts of ethyl ether and 50 parts of a 10% sodium bicarbonate solution. Upon fractional distillation of the ether extract, 127.9 parts of Δ'-carbomethoxy cyclohexene (B. P. 193° to 200° C.) are obtained.

Example II 10 parts of Δ'-carbomethoxy cyclohexene prepared as in Example I are passed in the vapor state over a nickel-chromium resistance wire maintained at 750° to 850° C. in an atmosphere of carbon dioxide and at a pressure of 10 mm. The pyrolysis products consist of a combustible gas and a yellow liquid which is collected in a cooled receiver. The liquid is then fractionated and the dimer of 2-carbomethoxy-1,3-butadiene (B. P. 103° to 105° C.) is obtained in substantial yield.

Example III 10 parts of Δ'-carbomethoxy cyclohexene are passed in the vapor state through a metal tube heated to a temperature of approximately 600° C. and connected to a receiver cooled in Dry Ice. The liquid pyrolysis product is then fractionated and the dimer of 2-carbomethoxy-1,3-butadiene is again obtained.

Similarly, when other Δ'-carboalkoxy cyclohexenes are pyrolyzed in accordance with this invention, dimers of other 2-carboalkoxy-1,3-butadienes are formed. Thus, for example, when Δ'-carboethoxy cyclohexene is pyrolyzed at a temperature of approximately 700° C. the dimer of 2-carboethoxy-1,3-butadiene is formed and when Δ'-carbobutoxy cyclohexene is pyrolyzed at a temperature of approximately 750° C. and a pressure of 10 mm., 2-carbobutoxy-1,3-butadiene is formed.

The dimers of 2-carboalkoxy-1,3-butadienes prepared by the method of this invention are very valuable for the preparation of monomers which may be used in the preparation of polymers and copolymers suitable as synthetic rubbers, synthetic resins and plastics as well as for many other uses.

Although specific examples are included herein, it is not intended to limit the invention thereto, for numerous modifications will be apparent to those skilled in the art, and are within the scope of the appended claims.

I claim:

1. The method which comprises pyrolyzing a compound of the formula

wherein R is a carboalkoxy radical, at a temperature of 500° C. to 900° C., and recovering a 2-carboalkoxy-1,3-butadiene dimer from the reaction product.

2. The method of claim 1 wherein the temperature of pyrolysis is in the range of 750° C. to 800° C.

3. The method which comprises pyrolyzing a compound of the formula

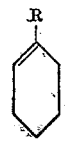

wherein R is a carboalkoxy radical containing fewer than 6 carbon atoms, at a temperature of from 750° C. to 850° C. and a pressure below 50 mm. and recovering a 2-carboalkoxy-1,3-butadiene dimer from the reaction product.

4. The method which comprises pyrolyzing Δ'-carbomethoxy cyclohexene at a temperature of 750° C. to 850° C. and a pressure of less than 50 mm. and fractionating the reaction product to obtain a dimer of 2-carbomethoxy-1,3-butadiene.

JEROME C. WESTFAHL.

No references cited.